US010512029B2

(12) United States Patent
Pradas et al.

(10) Patent No.: US 10,512,029 B2
(45) Date of Patent: Dec. 17, 2019

(54) USER EQUIPMENT CAMPING IN WIRELESS SYSTEMS

(71) Applicant: Telefonaktiebolaget LM Ericsson (publ), Stockholm (SE)

(72) Inventors: Jose Luis Pradas, Stockholm (SE); Icaro L. J. Da Silva, Bromma (SE); Gunnar Mildh, Sollentuna (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 450 days.

(21) Appl. No.: 15/038,991

(22) PCT Filed: Apr. 26, 2016

(86) PCT No.: PCT/SE2016/050371
§ 371 (c)(1),
(2) Date: May 24, 2016

(87) PCT Pub. No.: WO2017/188868
PCT Pub. Date: Nov. 2, 2017

(65) Prior Publication Data
US 2018/0084486 A1    Mar. 22, 2018

(51) Int. Cl.
H04W 4/00      (2018.01)
H04W 48/10     (2009.01)
(Continued)

(52) U.S. Cl.
CPC ........... H04W 48/10 (2013.01); H04W 24/10 (2013.01); H04W 48/16 (2013.01); H04W 48/20 (2013.01);
(Continued)

(58) Field of Classification Search
CPC ..... H04W 48/10; H04W 24/10; H04W 48/16; H04W 48/20; H04W 68/005;
(Continued)

(56) References Cited

U.S. PATENT DOCUMENTS

2005/0063330 A1* 3/2005 Lee .................. H04W 72/0413
370/328
2007/0259675 A1* 11/2007 Worrall ................ H04W 68/00
455/458

(Continued)

FOREIGN PATENT DOCUMENTS

WO     2016053155 A1    4/2016
WO  WO 2016053155 A1 *  4/2016    ............ H04W 48/12

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304 V12.6.0, Sep. 2015, 1-38.

(Continued)

Primary Examiner — Barry W Taylor
(74) Attorney, Agent, or Firm — Murphy, Bilak & Homiller, PLLC

(57) ABSTRACT

Methods and wireless devices for monitoring system information in a wireless communications network. An example method comprises selecting (620) a first downlink signal carrying uplink access configuration information, from among two or more candidate downlink signals carrying uplink access configuration information, based at least in part on signal quality measurements performed on the first downlink signal. The example method further includes selecting (630) a second downlink signal carrying tracking area information, from among two or more candidate downlink signals carrying tracking area information, based at least in part on signal quality measurements performed on the (Continued)

second downlink signal, where the selection of the second downlink signal is independent of the selection of the first downlink signal. The method further comprises camping (640) on the selected first downlink signal to monitor for uplink access configuration information, while simultaneously camping on the selected second downlink signal to monitor for tracking area information.

15 Claims, 7 Drawing Sheets

(51) Int. Cl.
| | | |
|---|---|---|
| *H04W 48/16* | (2009.01) | |
| *H04W 24/10* | (2009.01) | |
| *H04W 48/20* | (2009.01) | |
| *H04W 68/00* | (2009.01) | |
| *H04W 48/12* | (2009.01) | |
| *H04W 60/00* | (2009.01) | |
| *H04W 74/00* | (2009.01) | |

(52) U.S. Cl.
CPC .......... *H04W 68/005* (2013.01); *H04W 48/12* (2013.01); *H04W 60/00* (2013.01); *H04W 74/006* (2013.01)

(58) Field of Classification Search
CPC ............. H04W 68/4812; H04W 60/00; H04W 74/006; H04W 72/0413; H04W 72/042
See application file for complete search history.

(56) References Cited

U.S. PATENT DOCUMENTS

| | | | |
|---|---|---|---|
| 2008/0242297 A1 | 10/2008 | Lee et al. | |
| 2010/0105380 A1* | 4/2010 | Attar ...................... | H04W 48/16 455/434 |
| 2011/0261777 A1* | 10/2011 | Maeda .................. | H04W 48/20 370/329 |
| 2014/0295836 A1* | 10/2014 | Frenger ............... | H04W 74/006 455/434 |
| 2015/0208302 A1* | 7/2015 | Uemura ................ | H04W 48/02 455/436 |
| 2017/0374574 A1* | 12/2017 | Lee ........................ | H04W 16/24 |
| 2018/0359653 A1* | 12/2018 | Svedman .......... | H04W 56/0015 |

OTHER PUBLICATIONS

Frenger, Pål et al., "A Clean Slate Radio Network Designed for Maximum Energy Performance", 2014 IEEE 25th Annual International Symposium on Personal, Indoor, and Mobile Radio Communication (PIMRC), Sep. 2, 2014, 1300-1304.

* cited by examiner

USER EQUIPMENT CAMPING IN WIRELESS SYSTEMS

TECHNICAL FIELD

This disclosure pertains to wireless communication networks, and more particularly to techniques whereby wireless devices receive system information and paging/notification messages in a wireless communication network.

BACKGROUND

The so-called Long Term Evolution (LTE) wireless communication networks developed by members of the 3rd-Generation Partnership Project (3GPP) use orthogonal frequency-division multiplexing (OFDM) in the downlink and Discrete Fourier Transform spread (DFT-spread) OFDM (also referred to as single-carrier frequency-division multiple access, or FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing/bandwidth as the downlink and the same number of single carrier FDMA (SC-FDMA) symbols in the time domain as OFDM symbols in the downlink.

In the time domain, LTE downlink transmissions are organized into radio frames of 10 milliseconds, each radio frame consisting of ten equally-sized subframes of 1-millisecond length, as shown in FIG. 2. For normal cyclic prefix, one subframe consists of 14 OFDM symbols. The duration of each symbol is approximately 71.4 microseconds.

Furthermore, the resource allocation in LTE is typically described in terms of resource blocks, where a resource block corresponds to one slot (0.5 milliseconds) in the time domain and 12 contiguous subcarriers in the frequency domain. A pair of two adjacent resource blocks in time direction (1.0 milliseconds) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of the control information. A downlink system with CFI=3 OFDM symbols as control is illustrated in FIG. 3.

The reference symbols shown in FIG. 3 are the cell specific reference symbols (CRS) and are used to support multiple functions including fine time and frequency synchronization and channel estimation for certain transmission modes.

While the development and deployment of LTE networks provides users with greatly increased wireless data rates and has enabled the development of a wide variety of mobile broadband (MBB) services, demand for these services continues to grow. In addition to this increased demand for improved bandwidth and performance, new applications for special-purpose devices, such as machine-to-machine (M2M) devices, continue to be developed. These market forces indicate that a wireless communications technology with improved flexibility is needed, to better match the variety of service requirements for mobile data applications.

There has been a rapid growth in the number of wireless devices and applications in recent years, and this trend is highly likely to continue in the future. This growth signals a need for a new radio access technology (RAT), which may be regarded as a "5G" (5th-generation) wireless technology. One of the key goals of the current plans for 5G is to expand services offered by the network beyond mobile broadband (MBB). New use cases may come with new requirements. At the same time, 5G should also support a very wide frequency range and be very flexible when it comes to deployment options.

With the emergence of new applications with highly varying application needs, i.e., quality-of-service (QoS) parameters and deployment scenarios, a single, inflexible, physical-layer technology is not adequate to achieve the desired performance characteristics. For example, it is clear that some services require a shorter transmission time interval (TTI), compared to LTE, in order to reduce latency. In an OFDM system, shorter TTIs may be realized by changing subcarrier spacing or subcarrier bandwidth. (The terms subcarrier spacing and subcarrier bandwidth are used interchangeably herein.) Other services need support of relaxed synchronization requirements or very high robustness to delay spread—this may be done, in a system operating with cyclic prefix, by extending the cyclic prefix. These are just examples of possible requirements.

It is clear, however, that selecting parameters such as subcarrier spacing and cyclic prefix lengths is a tradeoff between conflicting goals. Thus, a radio access technology, e.g., the next generation, or "5G," RAT, advantageously provides flexible support for several variants of transmission parameters, commonly called "numerologies." Such transmission parameters might be symbol duration, which directly relates to subcarrier spacing in an OFDM system and in several other multicarrier modulation systems, number of subcarriers, or cyclic prefix duration.

Furthermore, it is beneficial to be able to simultaneously support several services on the same band. This allows for a dynamic allocation of resources (bandwidth for example) between the different services, and for efficient implementation and deployment.

One possible approach to physical layer design for a next-generation wireless system is geared towards fulfilling a wide range of varying QoS requirements including latency, reliability and throughput. In one possible new physical layer design, the scalability is adapted using different subcarrier spacing. This approach can support mixed-mode operation, which allows different subcarrier spacings to simultaneously coexist within the same frequency band. This technique might be referred to as multi-mode multi-carrier modulation or as involving multiple multicarrier modulation schemes; in this context, the terms "multicarrier modulation scheme" and "multicarrier modulation mode" should be regarded as interchangeable.

SUMMARY

In next-generation (NX) systems under development, a downlink signal referred to as a System Signature Index (SSI) is monitored by the UE to know the specific configuration, from among those signaled in a table containing a set of system information configurations, that the UE needs to use to, for example, access the network. This table may be referred to as an access information table (AIT). The SSI, according to this approach, is location-independent in the sense that it is not uniquely tied to a certain area and thus cannot be used to identify a certain area. This means that the UE should continuously or repeatedly monitor the SSI to be able to access the network. However, the network may use other nodes to transmit other control signals that need to be monitored, such as the AIT, tracking area codes, or paging indications. This means that the UE may need to simultaneously monitor downlink channels from different nodes. Accordingly, previous camping approaches, such as those used in LTE systems, cannot be applied any longer, since in those approaches the UE monitors downlink channels from a single cell on which the UE is camping and accesses the uplink based on the cell-specific system information for that same cell.

These problems are addressed by several embodiments of the presently disclosed techniques and apparatus, which include methods in a wireless device for monitoring system information in a wireless communications network. An example method comprises selecting a first downlink signal carrying uplink access configuration information, from among two or more candidate downlink signals carrying uplink access configuration information, based at least in part on signal quality measurements performed on the first downlink signal. The example method further includes selecting a second downlink signal carrying tracking area information, from among two or more candidate downlink signals carrying tracking area information, based at least in part on signal quality measurements performed on the second downlink signal, where the selection of the second downlink signal is independent of the selection of the first downlink signal. The method further comprises camping on the selected first downlink signal to monitor for uplink access configuration information, while simultaneously camping on the selected second downlink signal to monitor for tracking area information.

In some embodiments, the uplink access configuration information carried by the first downlink signal comprises an index value, and the method further includes identifying an uplink access configuration, from among a plurality of uplink access configurations stored by the wireless device in association with corresponding index values, and transmitting to the wireless network according to the identified uplink access configuration. In some of these embodiments, the method further includes decoding a third downlink signal to obtain an access information table, prior to the selecting of the first and second downlink signals, where the access information table comprises the plurality of uplink access configurations and the corresponding index values. These uplink access configurations and the corresponding index values are then stored. In some embodiments, the method further comprises receiving, on the first downlink signal, a paging indication directed to the wireless device, wherein the transmitting to the wireless network according to the identified uplink access configuration is in response to the paging indication.

In some embodiments, the selecting of the first downlink signal is further based on one or more selection rules specifying at least one of: one or more index values corresponding to downlink signals that should not be monitored by the wireless device for uplink access configuration information; priority information for one or more index values for downlink signals carrying uplink configuration information; and one or more relations between index values and mobility states for the wireless device, the relations indicating preferred, allowed, or disallowed index values for each of at least one mobility state. Similarly, in some embodiments the selecting of the second downlink signal may be further based on one or more selection rules specifying at least one of: one or more identifiers corresponding to downlink signals that should not be monitored by the wireless device for tracking area information; priority information for one or more identifiers for downlink signals carrying uplink configuration information; and one or more relations between identifiers of downlink signals and mobility states for the wireless device, the relations indicating preferred, allowed, or disallowed identifiers for each of at least one mobility state.

The techniques summarized above and detailed below provide a novel camping concept that fits the assumed network mechanisms of 5G/NX. These techniques enable the network to reliably locate the UE within a limited area for the purpose of paging the UE, as well as enabling the UE to access the network, despite the fact that transmission of the enabling information, the paging, and the network access may involve different nodes. Other embodiments of the presently disclosed techniques and apparatus, as detailed below, including wireless devices, computer program products, and functional implementations corresponding to the methods summarized above. Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
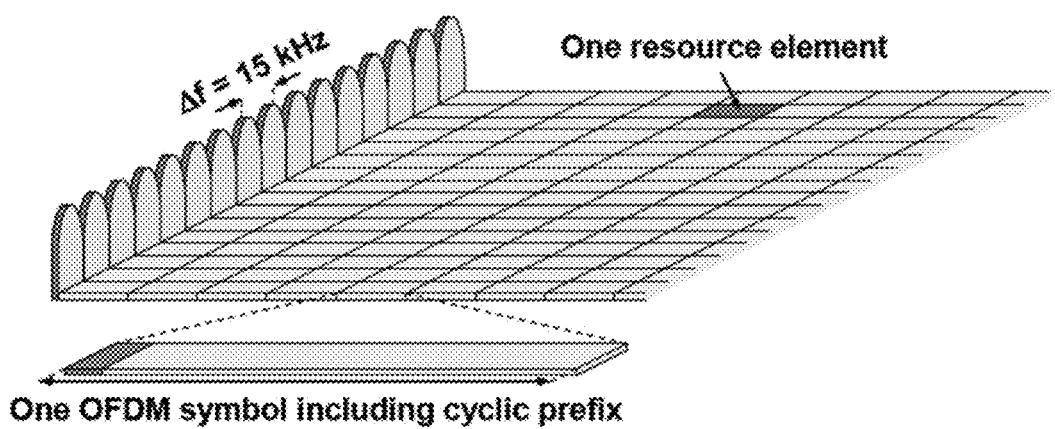
FIG. 1 illustrates a diagram illustrating LTE downlink physical resources.
Figure 2:
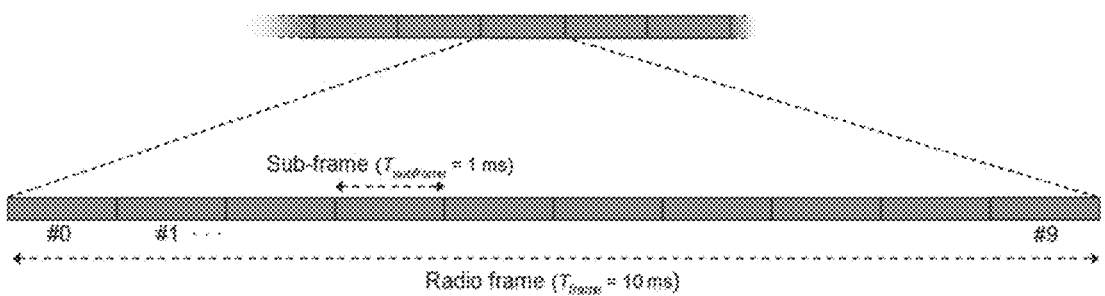
FIG. 2 illustrates a diagram of an LTE time-domain structure.
Figure 3:
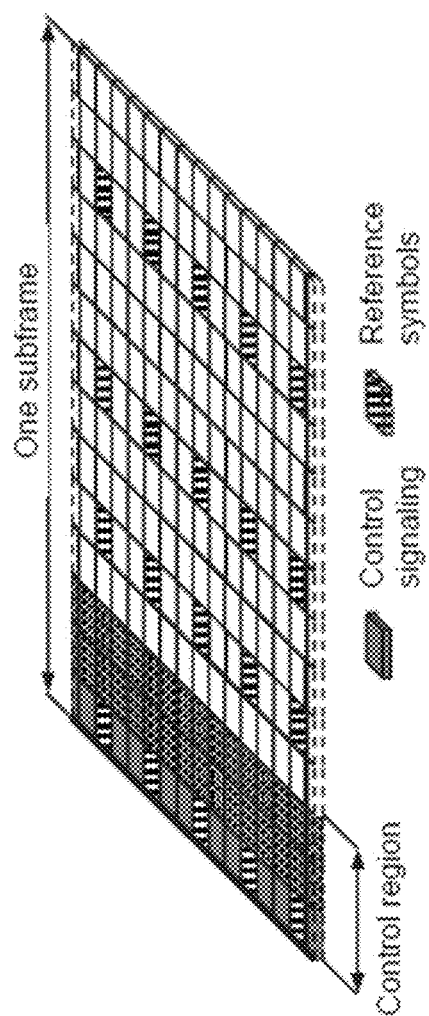
FIG. 3 illustrates a diagram of an LTE downlink subframe.

Although this disclosure details of the present invention in the context of a so-called "NX" system, a proposed 5G wireless communications system, it should be noted that this is only an illustrative scenario and should not be construed as limiting. The techniques and apparatus described herein may be applied to other wireless communication systems in which uplink access information and tracking area information, for example, are transmitted from different nodes, such that a wireless device needs to simultaneously camp on multiple signals, from different nodes, to monitor for uplink access information and tracking area information. Note that "simultaneously" here and elsewhere in the present document is meant to refer to activities that take place over time periods that at least partly overlap, and does not imply that the starting and/or end points of the activities are necessarily the same. It will be understood that "camping" refers to an ongoing process in a wireless device, e.g., while operating in an "idle" mode or other dormant or semi-dormant state, in which the wireless device occasionally activates its receiver to monitor for certain signals or messages. Because camping is characterized by intermittent reception, it will be understood that simultaneously camping on two signals, as described herein, does not imply that active reception of both signals is necessarily simultaneous.

The essence of the mixed-mode operation contemplated herein is as follows: At a transmitting node, two or more multicarrier signals are generated, each being composed of one or more symbols, but the multicarrier signals having different transmission parameters, or numerologies, e.g., with respect to subcarrier spacing and/or symbol duration. In some embodiments, the symbol durations for the two signals (and other parameters for the signals) may be selected so that symbol borders align periodically, even though the symbol durations for the two signals may vary. For instance, alignment may be achieved with a 1 millisecond periodicity—this provides a good match to existing LTE techniques, so that LTE signals can be combined, in the same frequency band, with one or more other multicarrier signals having different subcarrier spacings and/or symbol durations.

Whether or not this particular approach to the next-generation physical layer is adopted, it should be appreciated that in general, a transmitter and receiver require some form of synchronization in time or/and frequency before transmissions of messages can be received reliably. In cellular systems such as LTE, base stations broadcast narrowband synchronization signals regularly in time from which devices accessing the system can perform an initial cell search, i.e. going through a synchronization procedure that includes finding the carrier frequency, identifying time reference instants, and determining a cell identity, e.g., by decoding a reference signal sequence. An LTE device that has performed initial cell search and identified the transmitting cell's identity can then complete the initial synchronization in downlink by performing a fine synchronization using cell-specific reference signals (CRS), which are transmitted across the system bandwidth and more frequently in time than the synchronization signals. The device then connects to the network via a random access procedure in which uplink time synchronization is established and communications between the device and the base station can begin. Due to oscillator drifting at both the transmitter and receiver sides, the device needs to regularly perform fine frequency synchronization based on the downlink signal, during the communications with the base station.

For the next-generation wireless communications system (referred to herein as "NX"), a lean frame structure that omits cell-specific reference signals (CRS) has been proposed. With this approach, the reference signals required for fine synchronization and demodulation of a downlink physical data channel (PDCH) are embedded into the PDCH transmission itself. Thus, these reference signals may be considered to be user-specific reference signals, and may be beam-formed for a specific user, for example, along with the data transmitted to that user. Accordingly, a data transmission to a specific user may be considered to be "self-contained" in that it contains those reference signals needed by the receiving device for frequency synchronization and channel estimation, as well as the user data itself.

With this frame structure, the Physical Downlink Control Channel (PDCCH) and PDCH for a given user have their own reference signals for demodulation. These are typically referred to as Demodulation Reference Signals (DMRS), but these could also be other types of reference signals as will be discussed herein. Note that the DMRS should be transmitted early in the subframe to enable the receiver to perform early channel estimation, thus reducing receiver processing time.

Figure 4:
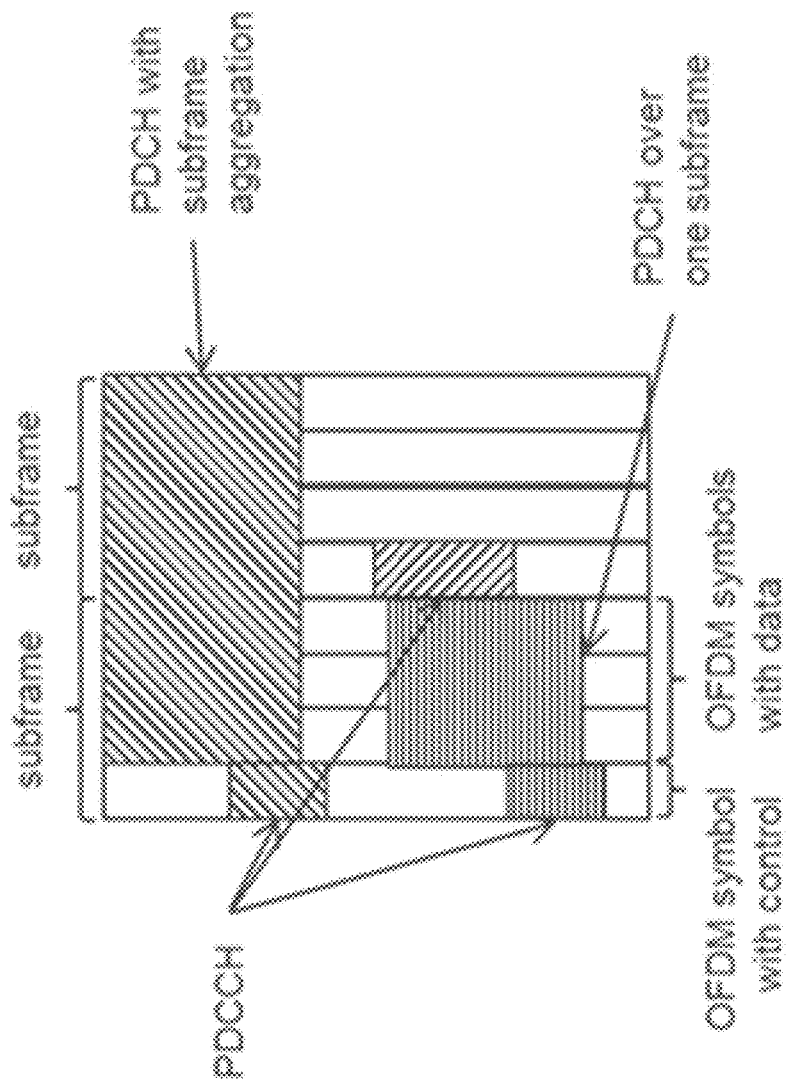
FIG. 4 illustrates an example mapping of PDCCH and PDCH to a downlink signal, for each of two users.

FIG. 4 illustrates an example scenario in which two downlink subframes carry PDCCH and PDCH for each of two users. For one of the users, the PDCH uses subframe aggregation, i.e., the PDCH extends across two subframes. In this example, there are several PDCCH transmissions, for several different users; these appear in the first Orthogonal Frequency Division Multiplexing (OFDM) symbol of each subframe. Of course, other arrangements are possible. Note that different users are indicated by the use of different shadings in the illustrated PDCH and PDCCH channels in the figure. Thus, a PDCH with a given shading pattern is scheduled by the PDCCH having the same shading pattern.

The term "camping" is used to refer to the behavior of a user equipment (UE—3GPP terminology for a wireless access device) when in a dormant state (e.g., Idle Mode in LTE, or CELL_FACH state in UMTS). A dormant UE "camps on," i.e., monitors certain signals transmitted by, the best cell from a set of ranked cells that the UE can receive. The UE tunes to that cell's control channel(s) so that the UE can receive system information, receive registration area information, e.g., Tracking Area information, and receive other access stratum (AS) and non-access stratum (NAS) information. The UE also camps on the control channel(s) to receive paging and notification messages, and to initiate transfer to connected mode, when necessary. This means that the UE receives and monitors relevant downlink channels and, when applicable, transmits in the uplink from/to the cell in which the UE is camping.

In LTE, to camp on a cell, the UE performs a cell (re-)selection procedure described in 3GPP TS 36.304. Before it can perform cell selection, the UE needs to acquire time and frequency synchronization, as briefly discussed above. After Physical Cell Identity (PCI) detection, the UE can perform channel estimation, thanks to the cell-specific reference signals, and perform measurements for cell ranking. The cells are ranked based on their reference signal received power (RSRP) and reference signal received quality (RSRQ). The network may provide the UE with certain offsets to apply to the cell (re-)selection formula.

RSRP is defined as the linear average over the power contributions of the resource elements that carry cell-specific reference signals (CRS) within the considered measurement frequency bandwidth. Reference Signal Received Quality (RSRQ) is defined as the ratio NxRSRP/(E-UTRA carrier RSSI), where N is the number of resource blocks (RBs) of the E-UTRA carrier radio-signal-strength-indicator (RSSI) measurement bandwidth. The measurements in the numerator and denominator of this expression are made over the same set of resource blocks.

E-UTRA Carrier Received Signal Strength Indicator (RSSI) comprises the linear average of the total received power as observed only in certain OFDM symbols of measurement subframes in the measurement bandwidth, over N RBs. This measurement accounts for energy received by the UE from all sources, including co-channel serving and non-serving cells, adjacent channel interference, thermal noise, etc.

In short, then, in LTE systems a UE decides which cell to camp on based on configured thresholds and measurements on cell-specific reference signals (CRS). These signals are constantly broadcasted per cell, where the camped cell is the one the UE then uses to receive System Information in dormant state.

In NX systems, as currently conceived, two distinct self-contained signals are used by a UE in dormant mode: the Access Information Table (AIT) and the System Signature Index (SSI). The term "self-contained" is meant here to indicate that data payload and reference symbols are transmitted together, e.g., in a self-contained grid, so that the data payload may be demodulated and decoded without using reference symbols from other signals. The network may transmit an AIT containing an aggregated set of configurations of essential parts of the system information, each configuration mapping to a certain SSI. Therefore, a SSI identifies a configuration, from among the aggregated set of configurations transmitted in the AIT. This configuration contains basic system parameters such as uplink access parameters.

The current concepts for NX allow deployments where the AIT is not transmitted by all the nodes. In multi-layer deployments, one possible configuration is that nodes with small coverage areas do not distribute the AIT, while nodes with larger coverage areas, providing wide-area coverage, distribute the AIT.

Each node which the UE may access should transmit a SSI. The SSI indicates to the UE the configuration, from among the configurations transmitted in the AIT, that the UE should use to access the network. This means that a given SSI need not be allocated to only a single node in the network. Instead, several nodes in the network may use the same SSI, if the same AIT record (i.e., the same system information configuration) applies in these nodes. The SSI may be changed (in order to make it point to a more suitable system information configuration in the AIT) by the nodes, depending on, for example, the network characteristics, load, time of the day, etc. Therefore, the SSI is location-independent and only points to a certain system information configuration. This is distinct from the LTE concept, in which the PCI is a cell-specific parameter.

Furthermore, in NX, paging indications may be transmitted by a set of nodes that are not necessarily the same nodes that transmit the AIT and/or SSI. To support paging, a "Tracking Area Code" (or some other area-specific code/signal) may be transmitted by the network (e.g. in system information, or in another downlink signal). If the UE enters an area which transmits a tracking area code different than those that have been previously configured for the UE by the network, the UE performs a tracking area update to inform the network that it has moved to a tracking area outside the tracking area or set of tracking areas which it was configured with. This knowledge is used by the network to send paging indications, when required, in the correct areas so that the network does not need to send paging indications over an excessively large area.

In LTE systems, location information for a particular cell is contained in the System Information transmitted by the cell. More specifically, the System Information contains the "Tracking Area Code"—with this code, a UE can identify the area/location it is in. If the area indicated by the Tracking Area Code is not contained in the Tracking Area list previously provided to the UE by the network, then the UE has to do a Tracking Area Update.

As discussed above, the SSI/AIT signals in the NX system do not provide location information for the transmitting node. This implies that the AIT may not be able to contain the "Tracking Area Code" (or the corresponding code for 5G/NX). Accordingly, a new mechanism to provide location information is needed.

One possible approach is to introduce a new signal, e.g., a Tracking RAN Area Signal (TRAS). This signal can convey location information, potentially indicating a new kind of area (i.e., Tracking RAN Area). When the UE decodes a TRAS that is not within its configured list, the UE performs a Tracking RAN Area Update and an updated list and an updated configuration may be provided to the UE.

The tracking area updates provide enough information to the network to locate the UE within a certain region. This is used when the NW needs to locate the UE, e.g., to transmit data. In such a situation, the network first finds the UE by means of paging. Paging indications are typically transmitted in the Tracking RAN Area(s) configured for the UE, or in specific cells/nodes within the current Tracking RAN Area(s) configured for the UE, e.g., the last node the UE is known to have contacted. When the UE receives the paging indication, the UE accesses the network.

If the UE does not access the network, which could be an indication that the UE has not received the paging signal, the NW may continue transmitting paging indications in other areas outside the first paging area used, and may optionally step-wise increase the paging area until the entire area (i.e., all the Tracking RAN Areas) configured for the UE has been covered. The NW may also repeat the page in locations where the UE has already been paged, in case the UE simply missed the previous page indication/message or its response got lost.

Figure 5:
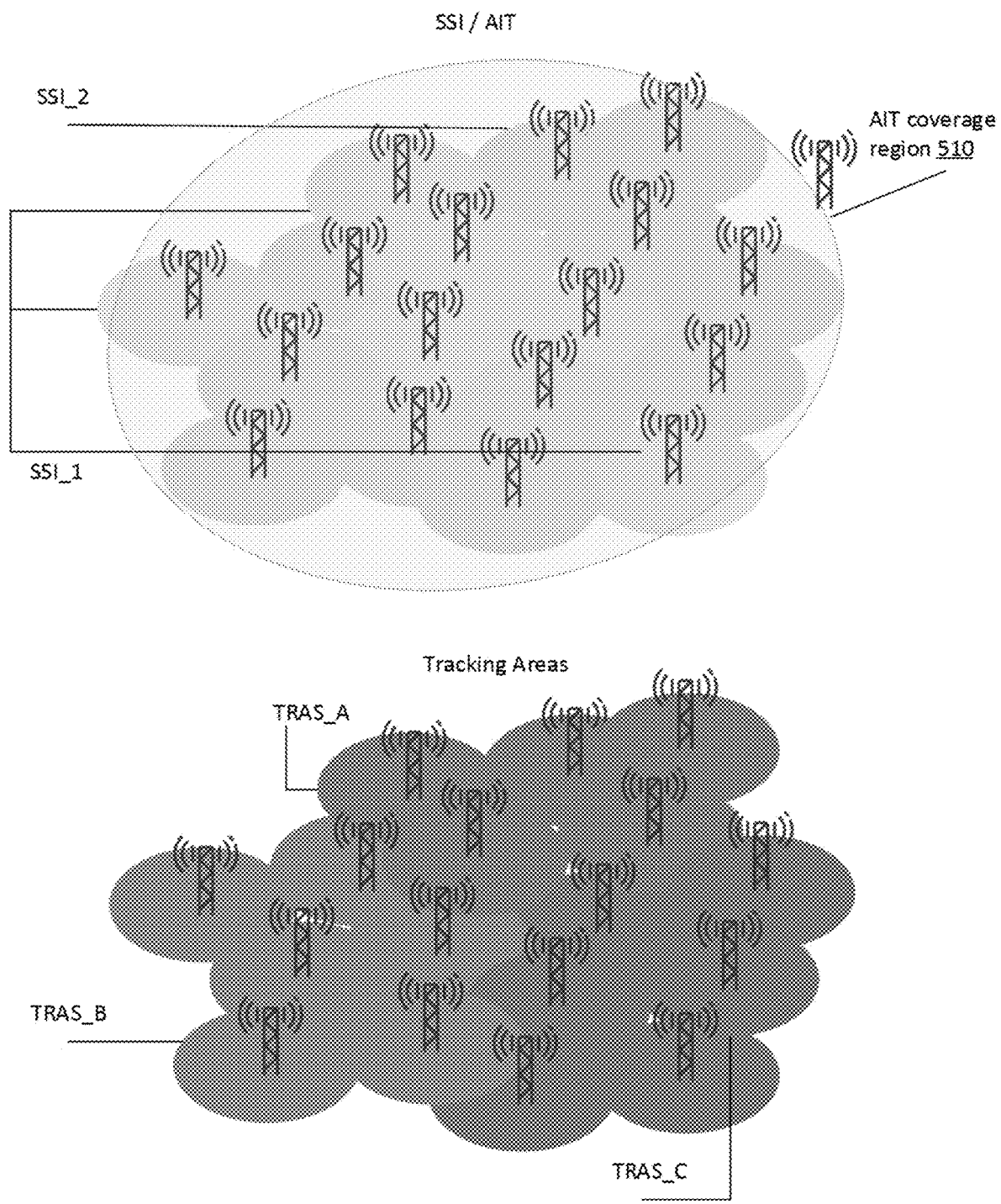
FIG. 5 illustrates distinctions between SSI/AIT signals and tracking area signals (TRAS), with an example mapping of SSI/AIT signals and TRASs to cells.

FIG. 5 illustrates the distinction between SSI/AIT and TRAS, as conceived for NX systems. The top portion of FIG. 5 illustrates several transmitting nodes in an AIT coverage region 510, where each of the transmitting nodes is transmitting one of three different SSI signals, i.e., either SSI_1 or SSI_2. These SSI signals each reference a configuration from among the multiple configurations specified in the AIT signal, which may be transmitted by one or more of the illustrated nodes, or by a separate node. Note that the example mapping of SSI signals to transmitting nodes shown here illustrates that the SSIs do not convey any particular information about the transmitting nodes' locations, as the mapping of SSIs to nodes does not depend on location. The specific encoding/formatting of the SSI can vary. In some embodiments, for example, the SSI may be encoded using one or more of a plurality of possible synchronization sequence(s), where the particular synchronization sequence(s) that is transmitted indicates a particular SSI index value. Such synchronization signals may have orthogonality properties, such as the Zadoff-Chu sequences used in LTE for PSS/SSS. In another example, the SSI may be encoded via a signal that includes a synchronization sequence, some payload identifying the SSI index value, and its own embedded reference symbols. This would be a self-contained signal in that there is no need for other reference signals to demodulate the payload or to synchronize.

The bottom portion of FIG. 5 illustrates the same transmitting nodes, which in this example are transmitting distinct signals conveying tracking area information, here referred to as TRASs. (Note that the nodes transmitting tracking area information may or may not include some or all of the nodes transmitting SSI or similar information, in various embodiments.) In this bottom portion of FIG. 5, it can be seen that the transmitting nodes are grouped into tracking areas, corresponding to the signals TRAS_A, TRAS_B, and TRAS_C, where there is no particular relationship between the tracking areas and the transmitted SSIs.

All of this implies that the UE must monitor the TRAS, so that the UE knows whether it can be reached by the network, and must also separately monitor the SSI, so that the UE knows which configuration, among those signaled by the AIT, is to be used to access the network. Note that the Tracking RAN Area Signal (TRAS) and Tracking Area Signal (TAS) terms and acronyms are used interchangeably to refer to the same concept in this document—it should be appreciated that different names may be used to refer to this signal, in various systems.

To address these issues, the present disclosure introduces a new "camping" concept for application within the NX framework. According to this approach, a UE camps on the best SSI or other signal that identifies an uplink configuration to access the network, according to SSI (re-)selection criteria, and also camps on the best tracking area signal, according to the tracking area (re-)selection criteria, to support UE tracking and paging. Since these signals may be transmitted from different nodes, the UE does not necessarily camp on a single "cell" or even on a single node, as it does in previous wireless systems. Instead, the UE monitors and simultaneously camps on certain signals, which provide access to basic services e.g., tracking/paging or network access.

More particularly, according to this new approach, the UE's camping is based on the separate ranking and selection of the following signals: the best measured downlink signal, as indicated by such parameters as RSRP, RSRQ, SNR, SINR, or other signal quality metric for reference signals, that specifies an uplink configuration to access the network, or an index/reference to such an uplink configuration; and the best signal carrying tracking area information, again as indicated by such parameters such as RSRP/RSRQ/SNR/SINR.

In some embodiments of this approach, the first of these two signals may be an SSI. The network may further provide SSI (re-)selection rules, e.g., via the AIT, or in System Information conveyed via LTE, or in the USIM, where these rules may be based on such things as: absolute priorities, where certain SSIs are preferred over other SSIs; blacklisted SSIs, i.e., SSIs which the UE should not monitor or camp on; and mobility/speed-based SSI selection, e.g., where certain SSIs are allowed or not allowed depending on the UE's speed or mobility status, e.g., whether the UE is static, mobile, or highly mobile.

In some embodiments, the second of the downlink signals may be referred to as a TAS. The network may, in some embodiments, further provide "TAS (re-)selection" rules, e.g., via the AIT, or in System Information conveyed via LTE, or in the USIM. Again, these rules might specify, in various embodiments: absolute priorities, where certain TASs are preferred over other TASs; blacklisted TASs, i.e., TASs that the UE should not monitor or camp on; or mobility/speed-based TAS selection, where certain TASs are allowed or not allowed depending on the UE's speed or mobility status, e.g., whether the UE is static, mobile, or highly mobile.

Note that for UEs which only have mobile-originated data, i.e., UEs that do not expect to be contacted first by the network, camping may be based only on the first of the two signals discussed above, i.e., the signal providing configuration information for uplink access, while for UEs supporting both mobile-originated data and network-originated data, camping may be based on at least both of the two signals discussed above, i.e., the signal providing configuration information for uplink access and the signal providing tracking area information.

Figure 6:
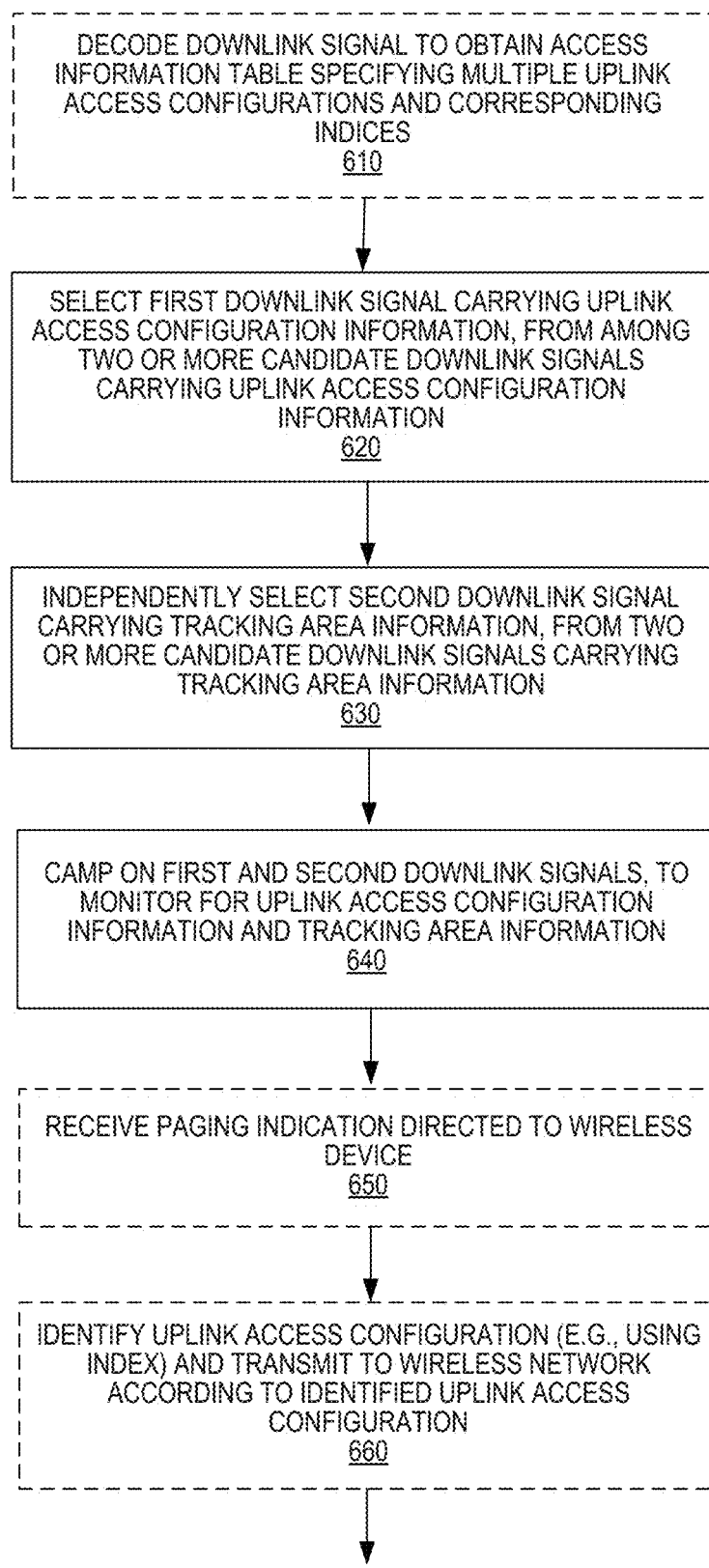
FIG. 6 is a process flow diagram illustrating an example method carried out by a wireless device.

In view of the discussion above, it will be appreciated that FIG. 6 illustrates an example method in a wireless device for monitoring system information in a wireless communications network. As shown at block 620, the method includes selecting a first downlink signal carrying uplink access configuration information, from among two or more candidate downlink signals carrying uplink access configuration information, based at least in part on signal quality measurements performed on the first downlink signal. The example method further includes selecting a second downlink signal carrying tracking area information, from among two or more candidate downlink signals carrying tracking area information, based at least in part on signal quality measurements performed on the second downlink signal, where the selection of the second downlink signal is independent of the selection of the first downlink signal. This shown at block 630. As shown at block 640, the method further comprises camping on the selected first downlink signal to monitor for uplink access configuration information, while simultaneously camping on the selected second downlink signal to monitor for tracking area information.

In some embodiments, the method further includes decoding a third downlink signal to obtain an access information table, prior to the selecting of the first and second downlink signals, where the access information table comprises a plurality of uplink access configurations and corresponding index values. This is shown at block 610, which is illustrated with a dashed outline to indicate that this operation need not occur in every embodiment or instance of the illustrated method. These uplink access configurations and the corresponding index values are then stored. In these embodiments, then the uplink access configuration information carried by the first downlink signal comprises an index value. In some of these embodiments, the method further includes identifying an uplink access configuration, from among the plurality of uplink access configurations stored by the wireless device in association with corresponding index values, and transmitting to the wireless network according to the identified uplink access configuration. This is shown at block 660. It will be appreciated that this transmitting may be a mobile-initiated access attempt, in some embodiments or instances. In other embodiments, the transmitting shown in block 660 may be in response to a page sent by the network. Thus, as shown at block 650, the method may further comprise, in some embodiments or instances, receiving a paging indication directed to the wireless device. In these embodiments, the transmitting to the wireless network according to the identified uplink access configuration, as shown in block 660, is in response to the paging indication.

As suggested above, in some embodiments the selecting of the first downlink signal may be further based on one or more selection rules specifying at least one of: one or more index values corresponding to downlink signals that should not be monitored by the wireless device for uplink access configuration information; priority information for one or more index values for downlink signals carrying uplink configuration information; and one or more relations between index values and mobility states for the wireless device, the relations indicating preferred, allowed, or disallowed index values for each of at least one mobility state. Similarly, in some embodiments the selecting of the second downlink signal may be further based on one or more selection rules specifying at least one of: one or more identifiers corresponding to downlink signals that should not be monitored by the wireless device for tracking area information; priority information for one or more identifiers for downlink signals carrying uplink configuration information; and one or more relations between identifiers of downlink signals and mobility states for the wireless device, the relations indicating preferred, allowed, or disallowed identifiers for each of at least one mobility state.

Figure 7:
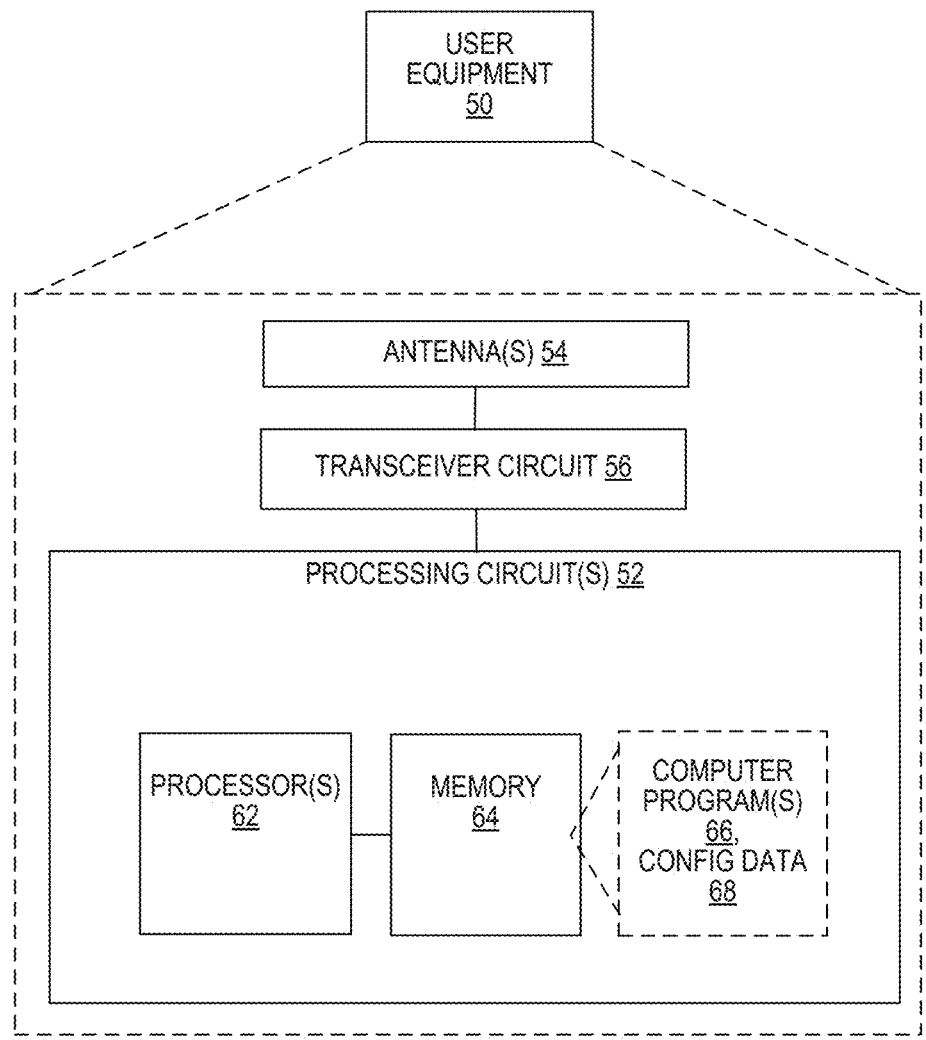
FIG. 7 is a block diagram of a wireless device, according to some embodiments.

FIG. 7 illustrates a diagram of a wireless device, such as a user equipment 50, according to some embodiments. To ease explanation, the user equipment 50 may be considered to represent any wireless device that may operate in a network. The UE 50 herein can be any type of wireless device capable of communicating with network node or another UE over radio signals. The UE 50 may also be referred to as, or comprise, in various contexts, a radio communication device, a target device, a device-to-device (D2D)-capable UE, a machine-type UE or UE capable of machine-to-machine (M2M) communication, a sensor equipped with UE, a PDA (personal digital assistant), a wireless tablet, a mobile terminal, a smart phone, a laptop-embedded equipment (LEE), a laptop-mounted equipment (LME), a USB dongle, a Customer Premises Equipment (CPE), etc.

The UE 50 communicates with one or more radio nodes or base stations via antennas 54 and a transceiver circuit 56. The transceiver circuit 56 may include transmitter circuits, receiver circuits, and associated control circuits that are collectively configured to transmit and receive signals according to a radio access technology, for the purposes of providing wireless communication services. In the present context, transceiver circuit 56 is configured to receive one or more downlink signals from each of two or more wireless network nodes and to transmit uplink signals to one or more wireless network nodes.

The UE 50 also includes one or more processing circuits 52 that are operatively associated with the radio transceiver circuit 56. The processing circuit 52 comprises one or more digital processing circuits, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

The UE 50, e.g., using processing circuitry 52, may be configured to perform all or some of the techniques described above, and in particular in connection to FIG. 6. For example, the processor 62 of the processor circuit 52 may execute a computer program 66 stored in the memory 64 that configures the processor 62 to operate as a wireless device according to the techniques discussed above. The processing circuit 52 of the UE 50 may thus be configured to use the transceiver circuit 56 and antenna(s) 56 to perform one or more methods as disclosed above, such as the method illustrated in FIG. 6, and variants thereof.

For instance, the processing circuit 52 may be configured, in some embodiments, to select a first downlink signal carrying uplink access configuration information, from among two or more candidate downlink signals carrying uplink access configuration information, based at least in part on signal quality measurements performed on the first downlink signal. The processing circuit 52 is further configured, in these embodiments, to select a second downlink signal carrying tracking area information, from among two or more candidate downlink signals carrying tracking area information, based at least in part on signal quality measurements performed on the second downlink signal, where the selection of the second downlink signal is independent of the selection of the first downlink signal. The processing circuit 52 is still further configured to use the transceiver circuit 56 to camp on the selected first downlink signal to monitor for uplink access configuration information, while simultaneously camping on the selected second downlink signal to monitor for tracking area information.

In some embodiments, the processing circuit 52 is further configured to decode a third downlink signal to obtain an access information table, prior to the selecting of the first and second downlink signals, where the access information table comprises a plurality of uplink access configurations and corresponding index values, and to store these uplink access configurations and the corresponding index values in memory 64. In these embodiments, then the uplink access configuration information carried by the first downlink signal comprises an index value. In some of these embodiments, the processing circuit 52 is further configured to identify an uplink access configuration, from among the plurality of uplink access configurations stored by the wireless device in association with corresponding index values, and to transmit to the wireless network, using the transceiver circuit 56, according to the identified uplink access configuration. Once again, it will be appreciated that this transmitting may be a mobile-initiated access attempt, in some embodiments or instances. In other embodiments, the transmitting may be in response to a page sent by the network. Thus, the processing circuit may be further configured to, in some embodiments or instances, receive a paging indication directed to the wireless device and to transmit to the wireless network, according to the identified uplink access configuration, in response to the paging indication.

Figure 8:
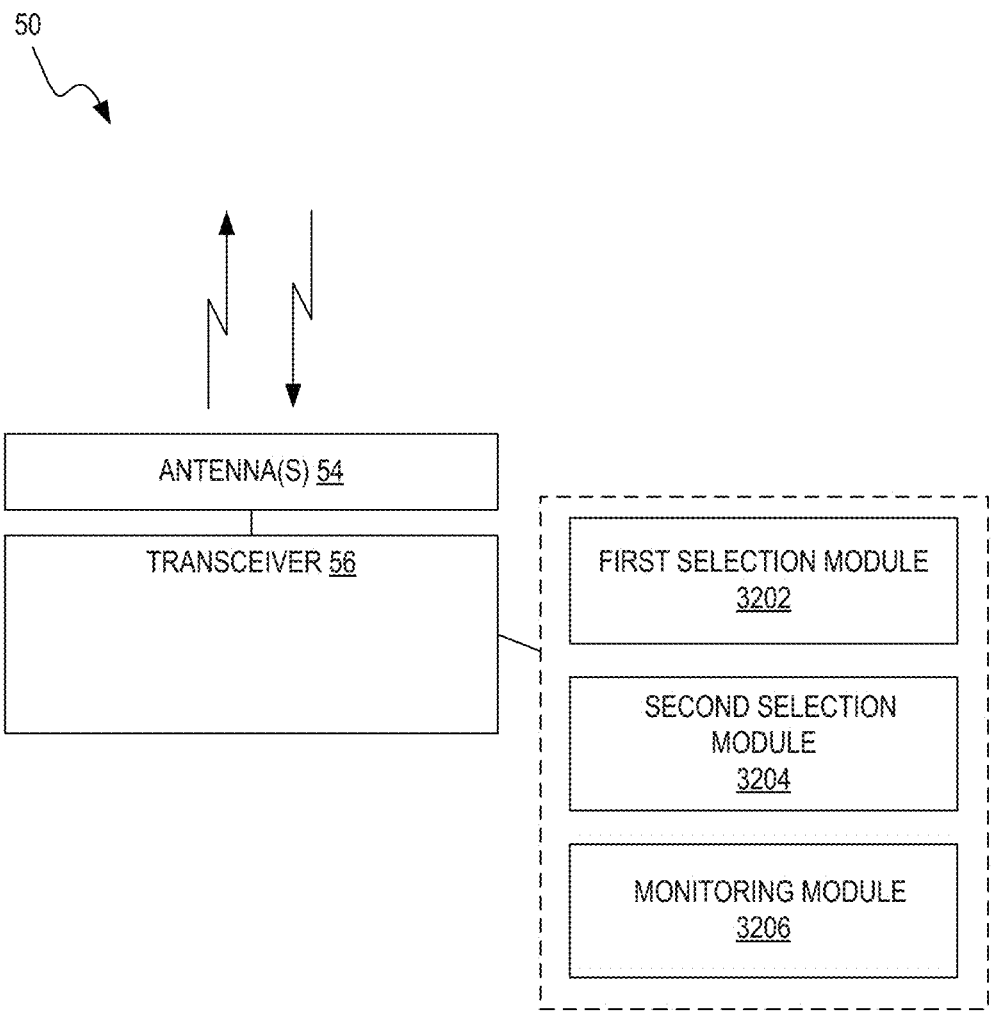
FIG. 8 is another block diagram of a wireless device, according to some embodiments.

It should be appreciated that the method of FIG. 6 can be understood as implemented with a number of functional modules, where each functional module may represent a module of software or firmware executing on a processing circuit, or a functional grouping of digital hardware, or a combination of both. Each functional module may correspond to one or more of the steps illustrated in the process flow diagram of FIG. 6, for example. FIG. 8 is a representation of an example UE 50 according to this functional approach, where processing circuit 52 comprises a first selection module 82 for selecting a first downlink signal carrying uplink access configuration information, from among two or more candidate downlink signals carrying uplink access configuration information, based at least in part on signal quality measurements performed on the first downlink signal, and a second selection module 84 for selecting a second downlink signal carrying tracking area information, from among two or more candidate downlink signals carrying tracking area information, based at least in part on signal quality measurements performed on the second downlink signal, where the selection of the second downlink signal is independent of the selection of the first downlink signal. The illustrated UE 50 further comprises a monitoring module 86 for camping on the selected first downlink signal to monitor for uplink access configuration information and camping on the selected second downlink signal to monitor for tracking area information. It should be understood that variations of the illustrated embodiment are possible, e.g., according to any of the several variations of the method shown in FIG. 6, as discussed above. It will be still further appreciated that still other embodiments of the presently disclosed invention include computer program products comprising modules or units of program instructions corresponding to the functional modules 82, 84, and 86; these computer program products may be stored in or carried by one or more computer-readable media, including, for example, non-transitory storage media such as a memory device or a program storage device.

Described above are methods and apparatus for implementing a new camping approach for wireless devices operating in a wireless communication network. With this approach, camping is not based on the cell concept, i.e., measurements of reference signals and the obtaining of cell identifier from a single node in a single cell, but is instead based on the monitoring of two signals that can be transmitted by different nodes—e.g., SSI and TRAS—and that are relevant respectively for network access (i.e., for uplink transmission) and paging (i.e., for downlink transmission). In some of the example embodiments detailed herein, the SSI provides information related to the configuration in the AIT, while the second signal is related to location information. Since both these signals are essential for the UE's operation, they must both be part of the UE's (re-)selection criteria when the UE is camping, so that both signals are received with appropriate quality. This must apply for both signals for a camping UE, even though the signals may be transmitted from different nodes Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a wireless device for monitoring system information in a wireless communications network, the method comprising:
   selecting a first downlink signal carrying uplink access configuration information, from among two or more candidate downlink signals carrying uplink access configuration information, based at least in part on signal quality measurements performed on the first downlink signal;
   selecting a second downlink signal carrying tracking area information, from among two or more candidate downlink signals carrying tracking area information, based at least in part on signal quality measurements performed on the second downlink signal, wherein the selection of the second downlink signal is independent of the selection of the first downlink signal;
   camping on the selected first downlink signal to monitor for uplink access configuration information, while simultaneously camping on the selected second downlink signal to monitor for tracking area information.

2. The method of claim 1, wherein the uplink access configuration information carried by the first downlink signal comprises an index value, and wherein the method further comprises:
   identifying an uplink access configuration from among a plurality of uplink access configurations stored by the wireless device in association with corresponding index values; and
   transmitting to the wireless network according to the identified uplink access configuration.

3. The method of claim 2, wherein the method further comprises:
   decoding a third downlink signal to obtain an access information table, prior to the selecting of the first and second downlink signals, the access information table comprising the plurality of uplink access configurations and the corresponding index values; and
   storing the plurality of uplink access configurations and the corresponding index values.

4. The method of claim 2, wherein the method further comprises receiving a paging indication directed to the wireless device, wherein the transmitting to the wireless network according to the identified uplink access configuration is in response to the paging indication.

5. The method of claim 1, wherein the measurements of the first downlink signal and the measurements of the second downlink signal comprise one or more of:
   reference signal received power, RSRP, measurements;
   reference signal received quality, RSRQ, measurements;
   signal-to-noise ratio, SNR, measurements; and
   signal-to-interference-plus-noise ratio, SINR, measurements.

6. The method of claim 1, wherein the selecting of the first downlink signal is further based on one or more selection rules specifying at least one of:
   one or more index values corresponding to downlink signals that should not be monitored by the wireless device for uplink access configuration information;
   priority information for one or more index values for downlink signals carrying uplink configuration information;
   one or more relations between index values and mobility states for the wireless device, the relations indicating preferred, allowed, or disallowed index values for each of at least one mobility state.

7. The method of claim 1, wherein the selecting of the second downlink signal is further based on one or more selection rules specifying at least one of:
   one or more identifiers corresponding to downlink signals that should not be monitored by the wireless device for tracking area information;
   priority information for one or more identifiers for downlink signals carrying uplink configuration information;
   one or more relations between identifiers of downlink signals and mobility states for the wireless device, the relations indicating preferred, allowed, or disallowed identifiers for each of at least one mobility state.

8. A wireless device configured for operation in a wireless communications network, the wireless device comprising:
   a transceiver circuit configured to receive one or more downlink signals from each of two or more wireless network nodes and to transmit uplink signals to one or more wireless network nodes; and
   a processing circuit operatively connected to the transceiver circuit and configured to:

select a first downlink signal carrying uplink access configuration information, from among two or more candidate downlink signals carrying uplink access configuration information, based at least in part on signal quality measurements performed on the first downlink signal;

select a second downlink signal carrying tracking area information, from among two or more candidate downlink signals carrying tracking area information, based at least in part on signal quality measurements performed on the second downlink signal, wherein the selection of the second downlink signal is independent of the selection of the first downlink signal;

monitor the selected first downlink signal for uplink access configuration information and monitor the selected second downlink signal for tracking area information, using the transceiver circuit, over respective periods that at least partially overlap.

9. The wireless device of claim 8, wherein the uplink access configuration information carried by the first downlink signal comprises an index value, and wherein the processing circuit is further configured to:

identify an uplink access configuration from among a plurality of uplink access configurations stored by the wireless device in association with corresponding index values; and transmit to the wireless network according to the identified uplink access configuration.

10. The wireless device of claim 9, wherein the processing circuit is further configured to:

decode a third downlink signal to obtain an access information table, prior to the selecting of the first and second downlink signals, the access information table comprising the plurality of uplink access configurations and the corresponding index values; and store the plurality of uplink access configurations and the corresponding index values.

11. The wireless device of claim 9, wherein the processing circuit is further configured to receive a paging indication directed to the wireless device, and to transmit to the wireless network according to the identified uplink access configuration in response to the paging indication.

12. The wireless device of claim 8, wherein the measurements of the first downlink signal and the measurements of the second downlink signal comprise one or more of:

reference signal received power, RSRP, measurements;
reference signal received quality, RSRQ, measurements;
signal-to-noise ratio, SNR, measurements; and
signal-to-interference-plus-noise ratio, SINR, measurements.

13. The wireless device of claim 9, wherein the processing circuit is configured to select the first downlink signal based further on one or more selection rules specifying at least one of:

one or more index values corresponding to downlink signals that should not be monitored by the wireless device for uplink access configuration information;

priority information for one or more index values for downlink signals carrying uplink configuration information;

one or more relations between index values and mobility states for the wireless device, the relations indicating preferred, allowed, or disallowed index values for each of at least one mobility state.

14. The wireless device of claim 9, wherein the processing circuit is configured to select the second downlink signal based further on one or more selection rules specifying at least one of:

one or more identifiers corresponding to downlink signals that should not be monitored by the wireless device for tracking area information;

priority information for one or more identifiers for downlink signals carrying uplink configuration information;

one or more relations between identifiers of downlink signals and mobility states for the wireless device, the relations indicating preferred, allowed, or disallowed identifiers for each of at least one mobility state.

15. A non-transitory computer-readable medium comprising, stored thereupon, a computer program product comprising program instructions for execution by a processor in a wireless device, the program instructions being configured so that, when the program instructions are executed by the processor, the program instructions cause the wireless device to:

select a first downlink signal carrying uplink access configuration information, from among two or more candidate downlink signals carrying uplink access configuration information, based at least in part on signal quality measurements performed on the first downlink signal;

select a second downlink signal carrying tracking area information, from among two or more candidate downlink signals carrying tracking area information, based at least in part on signal quality measurements performed on the second downlink signal, wherein the selection of the second downlink signal is independent of the selection of the first downlink signal;

camp on the selected first downlink signal to monitor for uplink access configuration information while simultaneously camping on the selected second downlink signal to monitor for tracking area information.

* * * * *